United States Patent [19]
Kanno

[11] Patent Number: 6,104,425
[45] Date of Patent: *Aug. 15, 2000

[54] METHOD AND APPARATUS FOR TRANSMITTING TELEVISION SIGNALS, METHOD AND APPARATUS FOR RECEIVING TELEVISION SIGNALS, AND METHOD AND APPARATUS FOR TRANSMITTING/RECEIVING TELEVISION SIGNALS

[75] Inventor: Kinya Kanno, Suita, Japan

[73] Assignee: Matsushita Electric Industrial Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,580

[22] Filed: Feb. 25, 1997

[30] Foreign Application Priority Data

Feb. 29, 1996 [JP] Japan .................................... 8-043506

[51] Int. Cl.[7] ............................ H04N 13/00; H04N 15/00
[52] U.S. Cl. ................................................. 348/43; 348/48
[58] Field of Search ................................... 348/36, 39, 42, 348/43, 47, 48, 53, 55; H04N 13/00, 15/00

[56] References Cited

U.S. PATENT DOCUMENTS

| | | |
|---|---|---|
| 4,062,045 | 12/1977 | Iwane . |
| 4,905,081 | 2/1990 | Morton ...................................... 348/43 |
| 5,475,422 | 12/1995 | Mori et al. ................................ 348/48 |
| 5,495,576 | 2/1996 | Ritchey .................................... 395/125 |
| 5,714,997 | 2/1998 | Anderson .................................. 348/48 |

FOREIGN PATENT DOCUMENTS

| | | |
|---|---|---|
| 54-142212A | 12/1976 | Japan . |
| 95/19093 | 7/1995 | WIPO . |

OTHER PUBLICATIONS

Proceedings of the Fifth International Conference on Computer Vision, "3–D Surface Reconstruction from Steroscopic Image Sequences," by R. Koch, pp. 109–114.

Primary Examiner—Howard Britton
Assistant Examiner—Nhon T. Diep
Attorney, Agent, or Firm—Parkhurst & Wendel, L.L.P.

[57] ABSTRACT

A method of transmitting TV signals comprises transmitting three-dimensional information representing three-dimensional shapes of a stereoscopic object from a plurality of view points, and image information of the stereoscopic object and two-dimensional information indicating a correspondence between points in a surface of the stereoscopic object represented by the three-dimensional information and the image information of the stereoscopic object, as TV signals.

7 Claims, 5 Drawing Sheets

METHOD AND APPARATUS FOR TRANSMITTING TELEVISION SIGNALS, METHOD AND APPARATUS FOR RECEIVING TELEVISION SIGNALS, AND METHOD AND APPARATUS FOR TRANSMITTING/RECEIVING TELEVISION SIGNALS

FIELD OF THE INVENTION

The present invention relates to a TV broadcasting system and, more particularly to a system which can display a desired object on the screen from various view points, that is, from arbitrary view points which a viewer demands.

BACKGROUND OF THE INVENTION

Today, in order to display a video image of a stereoscopic object from an arbitrary angle on the TV screen, the video image of the stereoscopic object is taken by a video camera rotating the stereoscopic object with the video camera's view point fixed to display the video image on the TV screen. Alternatively, the video image of the stereoscopic object is taken by the video camera from various angles with the stereoscopic object fixed to display the video image sequentially or dividedly on the screen. However, when performing video imaging for display on TV using these methods, it is common that the video images from view points which are predetermined by the broadcasting station are transmitted sequentially in a time sequence which is predetermined by the broadcasting station. Therefore, the viewer cannot see the video image of the stereoscopic object from an angle and a view point which the viewer demands. Some cable TVs provide a service to viewers as follows. For example, in a sport program, video images taken from various angles are broadcasted through different channels respectively, among which, the viewer can choose one with the video image taken from the angle which the viewer demands, thereby the viewer can choose the angle and the view point in watching the video image of one program.

However, in the above-described cable TVs, the viewer can only choose one among video images taken from a plurality of predetermined angles and view points. When seeing a stereoscopic object, the viewer can neither see the stereoscopic object from an angle or a view point which the viewer demands nor see the same from various angles and view points in a desired sequence continuously through the same channel.

SUMMARY OF THE INVENTION

It is an object of the present invention to provide a method and an apparatus for transmitting TV signals, a method and an apparatus for receiving TV signals and a method and an apparatus for transmitting/receiving TV signals, wherein the viewer can see a video image of a stereoscopic object from angles and view points which the viewer demands and can see video images of the stereoscopic object from various angles and view points continuously through the same channel.

Other objects and advantages of the present invention will become apparent from the detailed description given hereinafter. It should be understood, however, that the detailed description and specific embodiment are given by way of illustration only, since various changes and modifications within the scope of the invention will apparent to the those skilled in the art from this detailed description.

According to a first aspect of the present invention, a method of transmitting TV signals comprises transmitting three-dimensional information representing a three-dimensional configuration of a stereoscopic object to be transmitted, image information of the stereoscopic object obtained when the stereoscopic object to be transmitted is viewed from a plurality of directions, and two-dimensional information indicating a correspondence between points in a surface of the stereoscopic object represented by the three-dimensional information and the image information of the stereoscopic object, as TV signals.

According to a second aspect of the present invention, an apparatus for transmitting TV signals comprises a three-dimensional information extracting means for extracting three-dimensional configuration information representing a three-dimensional configuration of the stereoscopic object from stereoscopic information of the stereoscopic object viewed from respective direction among a plurality of directions, an image information extracting means for extracting image information of the stereoscopic object viewed from respective directions among the plurality of directions and a two-dimensional information extracting means for extracting two-dimensional information indicating a correspondence between points in a surface of the stereoscopic object represented by the three-dimensional information and the image information of the stereoscopic object.

According to a third aspect of the present invention, in the apparatus for transmitting TV signals according to the second aspect, data of the stereoscopic object is produced by a computer, and the three-dimensional information extracting means, the image information extracting means, and the two-dimensional information extracting means produce the three-dimensional information, the image information and the two-dimensional information of the stereoscopic object with the use of the data of the stereoscopic object produced by the computer.

According to a fourth aspect of the present invention, a method of receiving TV signals comprises storing three-dimensional information representing a three-dimensional configuration of the stereoscopic object, image information of the stereoscopic object obtained when the stereoscopic object to be transmitted is viewed from a plurality of directions and two-dimensional information indicating a correspondence between points in a surface of the stereoscopic object represented by the three-dimensional information and the image information of the stereoscopic object, which have been transmitted as TV signals; and upon receipt of an external instruction signal, selecting required data among the stored data, followed by operation and display, to display a video image of the stereoscopic object from an angle determined by the instruction signal.

According to a fifth aspect of the present invention, an apparatus for receiving TV signals comprises a data representing a three-dimensional configuration of a stereoscopic object, image information of the stereoscopic object obtained when the stereoscopic object to be transmitted is viewed from a plurality of directions and two-dimensional information indicating a correspondence between points in a surface of the stereoscopic object represented by the three-dimensional information and the image information of the stereoscopic, which have been transmitted as TV signals; and a data operation and display means for selecting required data among the stored data, followed by operation and display, upon receipt of an external instruction signal, to display a video image of the stereoscopic object from an angle determined by the instruction signal.

According to a sixth aspect of the present invention, a method of transmitting/receiving TV signals comprises transmitting three-dimensional information representing a three-dimensional configuration of a stereoscopic object to be transmitted, image information of the stereoscopic object obtained when the stereoscopic object to be transmitted is viewed from a plurality of directions and two-dimensional information indicating a correspondence between points in a surface of the stereoscopic object represented by the three-dimensional information and the image information of the stereoscopic object, as TV signals; upon receipt of the transmitted TV signals, storing the three-dimensional information, the image information and the two-dimensional information of the object; and upon receipt of an external instruction signal, selecting required data among the stored data, followed by operation and display, to display a video image of the stereoscopic object from an angle determined by the instruction signal.

According to a seventh aspect of the present invention, an apparatus for transmitting/receiving TV signals comprises a three-dimensional information extracting means for extracting a three-dimensional configuration information representing a three-dimensional configuration of a stereoscopic object from stereoscopic information of the stereoscopic object viewed from a plurality of directions an image information extracting means for extracting respective image information of the stereoscopic object viewed from respective direction among a plurality of directions; and two-dimensional information extracting means for extracting two-dimensional information indicating a correspondence between points in a surface of the stereoscopic object represented by the three-dimensional information and the image information of the stereoscopic object, in a transmission section, and further comprises a data storage means for storing the three-dimensional information, the image information and the two-dimensional information; and a data operation and display means for selecting required date among the stored data, followed by operation and display, upon receipt of an external instruction signal, to display a video image of the stereoscopic object from an angle determined by the instruction signal, in a receiving means.

DETAILED DESCRIPTION OF THE PREFERRED EMBODIMENTS

[Embodiment 1]

Figure 1:
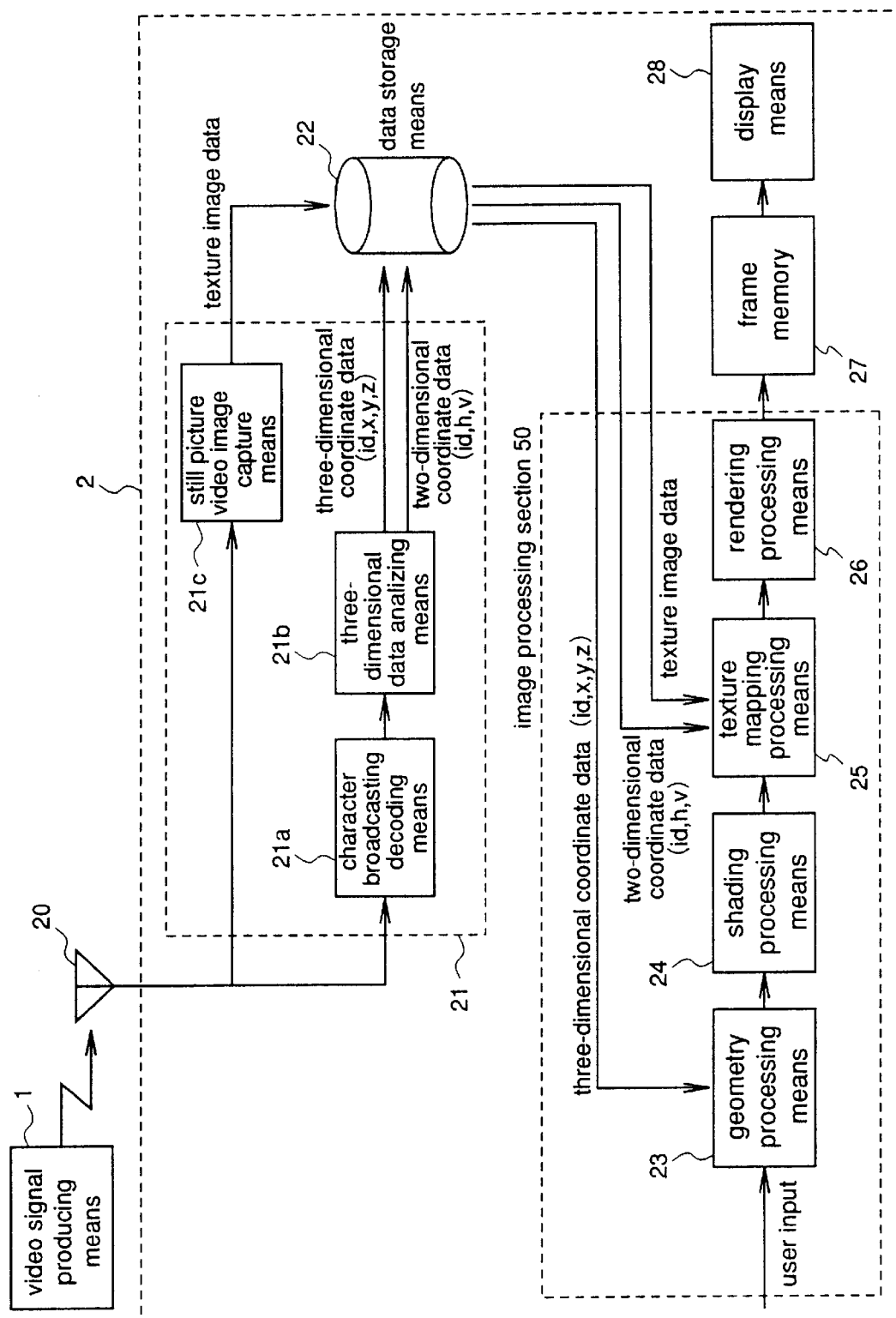
FIG. 1 is a block diagram illustrating a construction of an apparatus for transmitting/receiving TV signals according to an embodiment 1 of the present invention.

FIG. 1 is a block diagram illustrating a construction of an apparatus for transmitting/receiving TV signals according to an embodiment 1. In the figure, reference numeral 1 designates a video signal producing means provided in a broadcasting station of TV broadcast. Numeral 2 designates a video signal receiving section provided in a receiving station of the TV broadcast (a TV receiver).

Figure 2:
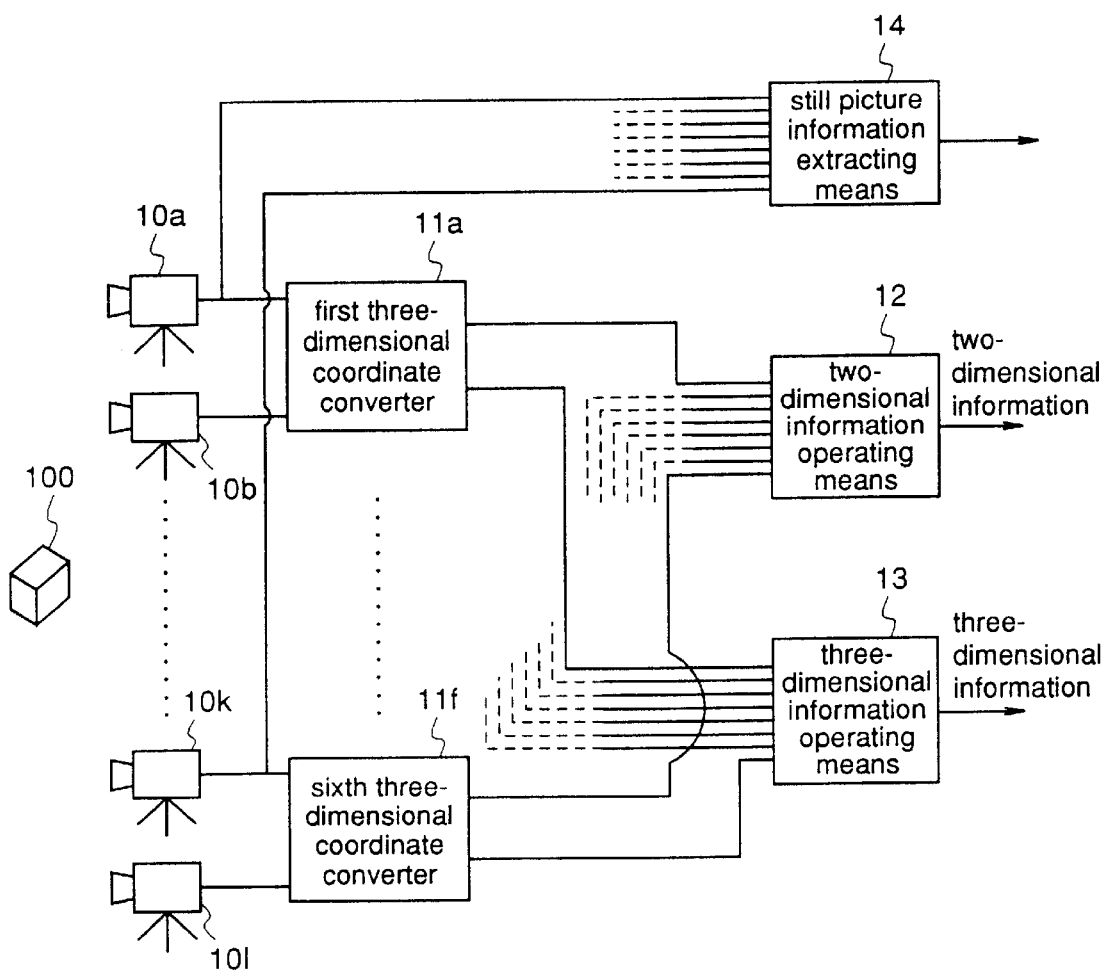
FIG. 2 illustrates a detailed construction of a video signal producing means in the apparatus for transmitting/receiving TV signals.

FIG. 2 illustrates a detailed construction of the video signal producing means 1 provided in the broadcasting station. In the figure, reference characters 10a, 10b–10k and 10l designate video cameras for taking video images of a stereoscopic object 100 from six directions, that is, front, rear, top, bottom, left-side and right-side views, at the same time. Reference characters 11a–11f designate first to sixth three-dimensional coordinate converters for obtaining each stereoscopic information of the stereoscopic object 100 as three-dimensional coordinates from each video image taken by each pair of adjacent video cameras among video cameras 10a, 10b–10k and 10l. Reference numeral 12 designates a two-dimensional information operating means for operating the two-dimensional information of the stereoscopic object 100 from outputs of the first to sixth three-dimensional coordinate converters 11a–11f. Reference numeral 13 designates a three-dimensional information operating means for operating three-dimensional information of the stereoscopic object 100 from outputs of the first to sixth three-dimensional coordinate converters 11a–11f. Reference numeral 14 designates a still picture information extracting means for extracting still picture information of the stereoscopic object 100 from an output of each one video camera 10a–10k among the adjacent pair of video cameras among the video cameras 10a, 10b–10k and 10l.

The video signal receiving section 2 provided in the TV receiver comprises a receiving antenna 20 for receiving a transmitted video signal; a decoding section 21 for decoding the video signal and a character broadcasting signal from the transmitted signal; a data storage means 22 for storing the two-dimensional information, the three-dimensional information, and texture image data of the stereoscopic object 100; an image processing section 50 including a geometry processing means 23, a shading processing means 24, a texture mapping processing means 25 and a rendering processing means 26 for producing a three-dimensional video image; a frame memory 27 and a display means 28.

A description is given of an operation of the apparatus for transmitting/receiving TV signals according to the embodiment 1. In FIG. 2, reference characters 10a–10l designate video cameras, in which adjacent ones are disposed in pairs such as 10a–10b, 10c–10d, 10e–10f, 10g–10h, 10i–10j, and 10k–10l. A pair of cameras take one view of the video image of the object 100, among six views, that is, front, rear, top, bottom, left-side and right-side views. From the image output of each pair of video cameras, the three-dimensional information in one view of the stereoscopic object, that is, concave-convex information is extracted using a technique such as a stereo technique. For example, the pair of video cameras 10a and 10b are disposed to view the stereoscopic object 100 from different angles, respectively. Two video signals from these different angles are input to the first three-dimensional coordinate converter 11a, in which the two video signals are processed using the stereo technique to produce the concave-convex information in one view of the stereoscopic object 100. The three-dimensional information of the stereoscopic object 100 is obtained from the plurality of concave-convex information of the stereoscopic object 100 obtained using the plurality of video cameras. In addition, with the output of the first three-dimensional coordinate converter 11a, image information in one view of the stereoscopic object 100 (still picture information) is extracted from the video images taken by the pair of video cameras 10a, 10b. The two-dimensional information indicating a correspondence between the three-dimensional information and the above-described image information of the stereoscopic object 100 is obtained by the operation of the two-dimensional coordinate information operating means 12. Thus, the three-dimensional information, the image information, and the two-dimensional information of the stereoscopic object 100 are obtained from the outputs of video images in six views of the stereoscopic object using the six pairs of video cameras.

The three-dimensional information of the stereoscopic object 100 obtained as described above is transmitted in radio waves from the video signal producing means 1. For example, when the stereoscopic object 100 is represented by 1024 points, the three-dimensional information of the stereoscopic object is managed as a set of information including id (identification number), an x-axis coordinate, a y-axis coordinate and a z-axis coordinate, i.e., as the three-dimensional information (id, x, y, z). When the x-axis, y-axis and z-axis coordinates respectively are transmitted as data within 2048 pixels, the three-dimensional information (id, x, y, z) is represented by 10+12+12+12=46 bits, approximately 6 Bytes (48 bits). Therefore, information of the 1024 points is transmitted in 1024×46 (bits), approximately 6 K Bytes. Since data transfer rate of the current character broadcasting is 22 Bytes×4H×60=5280 Bytes/sec, the three-dimensional information is transmitted in one second or more in the current character broadcasting. As timing for transmission, as in the case of current character multiplex broadcasting, a method of using a vacant scanning line within the returning period is employed.

Similarly, the two-dimensional information is managed as a set of information including id, x-axis and y-axis coordinates (h, v), i.e., the two dimensional information (id, h, v). When x-axis and y-axis coordinates (h, v) are transmitted as data within 768, 480 pixels, respectively, the two-dimensional information (id, h, v) corresponding to the above-described three-dimensional information is represented by 10+10+9=29 (bits), approximately 4 Bytes. Therefore, the two-dimensional information of 1024 points is transmitted in about 1024×29 (bits), approximately 4 K Bytes. Since the data transfer rate of the current character broadcasting is 22 Bytes×4H×60=5280 Bytes/sec as described above, the two-dimensional information is transmitted in one second or less in the current character broadcasting.

The still picture information in six views of the stereoscopic object is obtained by extraction from the image output of one video camera among the pair of video cameras in the still picture extracting means 14, and this still picture information is transmitted as normal TV video signals.

Thus produced TV signals including the still picture information, the two-dimensional information, and the three-dimensional information are received by the antenna 20 in the video signal receiving means 2, and are decoded in the decoding section 21. The video signal input to the decoding section 21 is decoded into a normal video signal and character information by the character broadcasting decoding means 21a. The character information is transmitted to a three-dimensional data analyzing means 21b. In the three-dimensional data analyzing means 21b, the three-dimensional information (id, x, y, z) and the two-dimensional information (id, h, v) of the stereoscopic object 100 produced in the video signal producing means 1 are reproduced and output to the data storage means 22 comprising an HDD or the like, to be stored therein. The still picture information included in TV signals is reproduced in a still picture capturing means 21c and stored in the data storage means 22 as texture image data.

Figure 3:
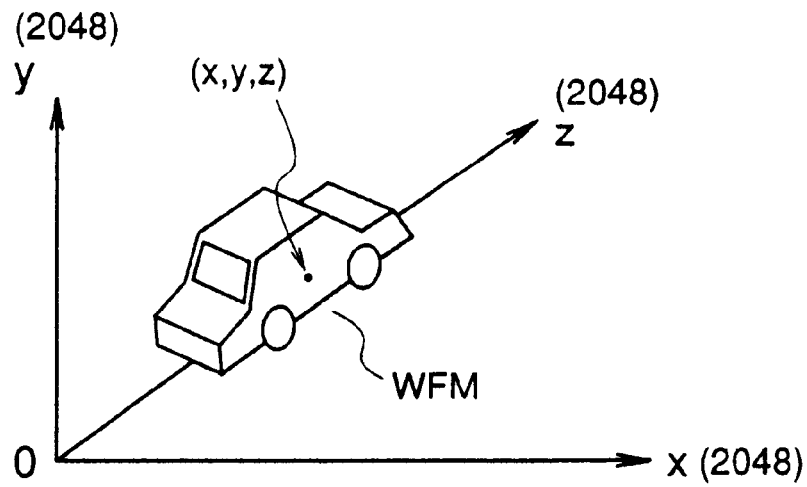
FIG. 3 illustrates an operation of a video signal receiving means in the apparatus for transmitting/receiving TV signals.
Figure 3:
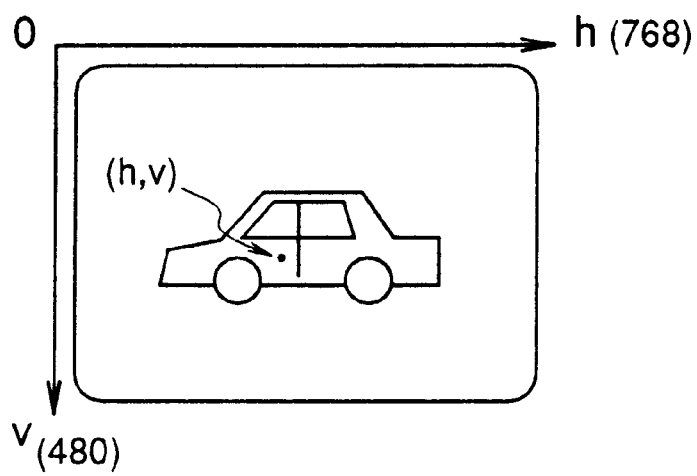
Figure 3:
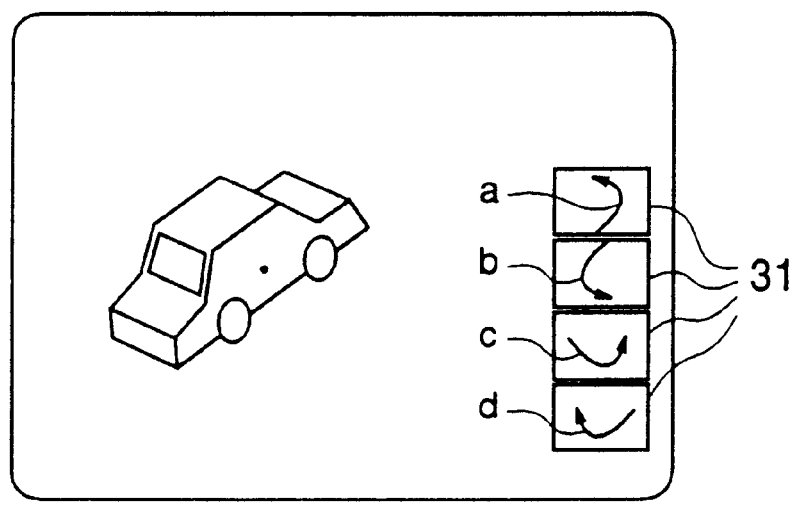
Figure 4:
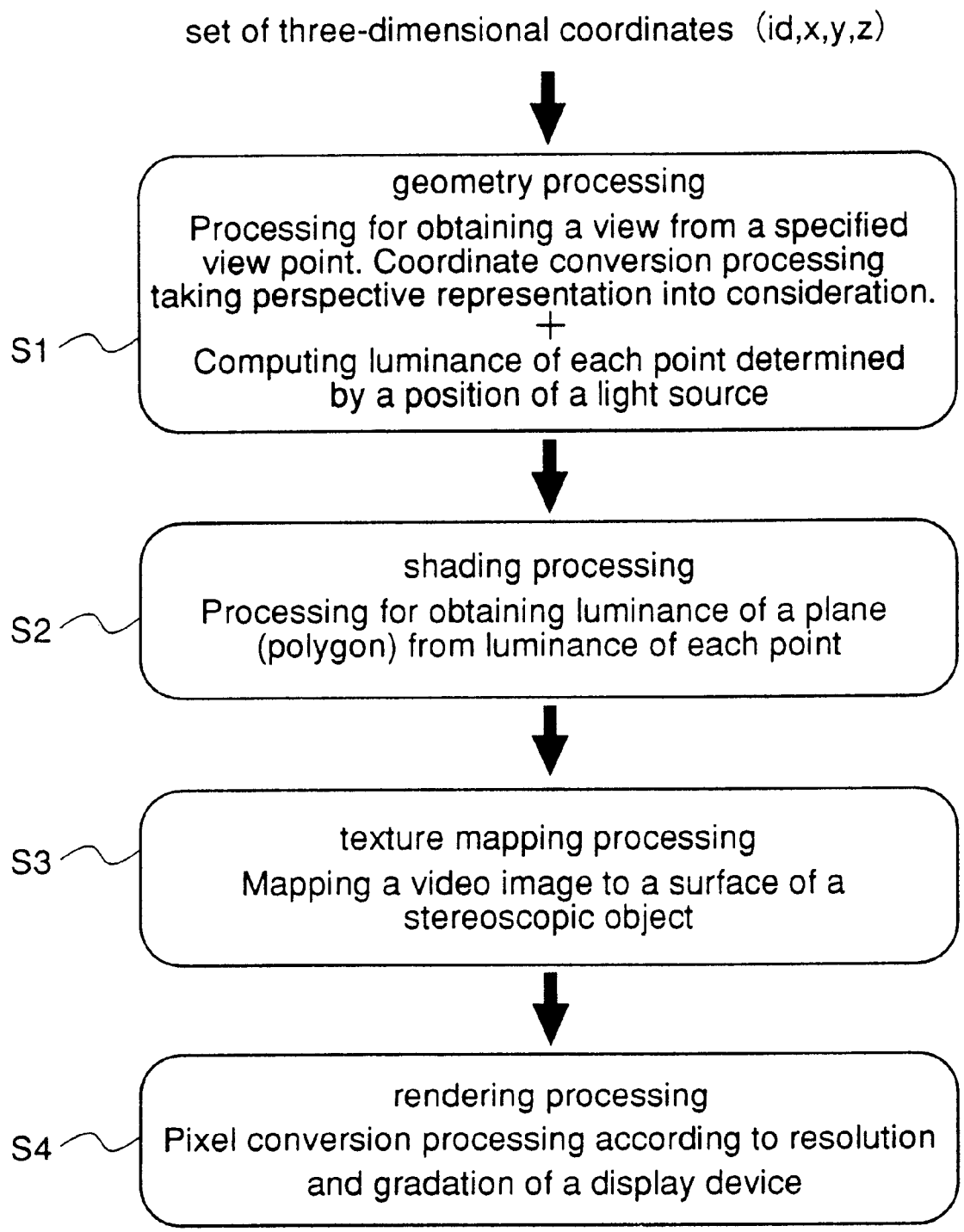
FIG. 4 is a flow chart illustrating a flow of image processing in an image processing means 50 in the video signal receiving means in the apparatus for transmitting/receiving TV signals.

After data required to display the stereoscopic object 100 is stored in the data storage means 22 as described above, the image processing means 50 performs following image processing using the image data stored in the data storage means 22 In step S1 illustrated in FIG. 4, the geometry processing means 23 computes a view from a point corresponding to the id, upon receipt of an user input and based on an initial value of display angle in reproducing the image in the receiver corresponding to one coordinate data id of the transmitted three-dimensional information (id, x, y, z). Further, the geometry processing means 23 computes luminance of each 1024 point determined by a distance between a light source and each of the 1024 points, thereby a so-called Wire Frame Model (WFM) is produced as illustrated in FIG. 3(a).

In step S2 illustrated in FIG. 4, in the shading processing means 24, luminance of each polygon plane is obtained from polygon (plane) normal vector obtained referring to the three-dimensional information (id, x, y, z) (FIG. 3(a)) and the angle of the light source.

In step S3 illustrated in FIG. 4, in the texture mapping processing means 25, a texture mapping is performed in such a manner that the texture image data is read from the data storage means 22 and a pattern (video, texture) is mapped to a surface of what is obtained by the luminance information which is obtained in the shading processing means 24 being added to the Wire Frame Model which is obtained in the geometry processing means 23.

In the rendering processing means 26, a pixel conversion is executed to the image data output from the texture mapping means 25 in accordance with resolution and gradation of a display device (CRT, printer or the like) and the image data by rendering is written into the frame memory the image data written into the frame memory 27 is subjected to D/A conversion in the display means 28, and is displayed on the display device such as CRT.

In the operation described above, the geometry processing means 23 has capability of producing and displaying the video image viewed from the angle and the view point according to the display initial value which is set in the receiver with respect to the image information of the object 100 stored in the data storage means 22 as well as capability of converting the video image into a video image from an angle and a view point which the viewer arbitrarily demands to display the same. Therefore, upon receipt of an external user input, the geometry processing means 23 can perform processing of steps S1 to S4 illustrated in FIG. 4 from an angle indicated by the user input to produce the video image of the configuration of the stereoscopic object 100 viewed from the angle and the view point indicated by the user input to display the same on the screen. Specifically, as illustrated in FIG. 3(c), icons 31 each for indicating a rotation direction are displayed at a corner of the screen. One is selected from those icons 31 on the screen using a cursor or the like as a user input, and, the video image on the screen is rotated in the direction of each arrow a to d to display the rotated video image.

In order to display the video image of the stereoscopic object viewed from a changed view point, when a high-speed operation is possible, the video image of the stereoscopic object may be displayed continuously changing the view point of the stereoscopic object. Further, when a higher-speed operation is possible, the video image of a moving object may be displayed changing view points.

Thus, in accordance with the embodiment 1 of the present invention, the method of transmitting/receiving TV signals comprises extracting three-dimensional information obtained from the stereoscopic information of the six-view images of the stereoscopic object 100, the two-dimensional information indicating a correspondence between the three-dimensional information and the image information, and the video information (still picture information), transmitting these information as video signals and character multiplex broadcasting data, and synthesizing and displaying the video image viewed from the angle which the viewer demands based on these information in the receiving section. Therefore, in case of displaying a car, video images of the car in six views obtained by taking images from respective six views are transmitted through the same channel and thus the viewer can obtain a desired video image of the car viewed from an arbitrary angle which the user demands. Accordingly, the TV viewer can observe various kinds of articles and products to a greater detail, resulting in a system which is quite appropriate for home shopping.

In accordance with the embodiment 1, transmitting and receiving of the three-dimensional information and the two-dimensional information are realized in the current character broadcasting system. Therefore a transmission apparatus and a receiving apparatus for existing character broadcasting can be employed.

When an existing TV receiver having no function to receive the character broadcasting receives radio waves transmitted according to the embodiment 1, it receives only image information, which is displayed as a normal video image. Therefore, the present invention provides compatibility with the existing TV receiver.

[Embodiment 2]

In the embodiment 1, the video image of the stereoscopic object 100 is taken directly by the video cameras 10a, 10b–10k and 10l. In an embodiment 2, as illustrated in FIG. 5, data produced by CAD (Computer Aided Design) is input to produce two-dimensional information, three-dimensional information, and still picture information of the stereoscopic object.

Figure 5:
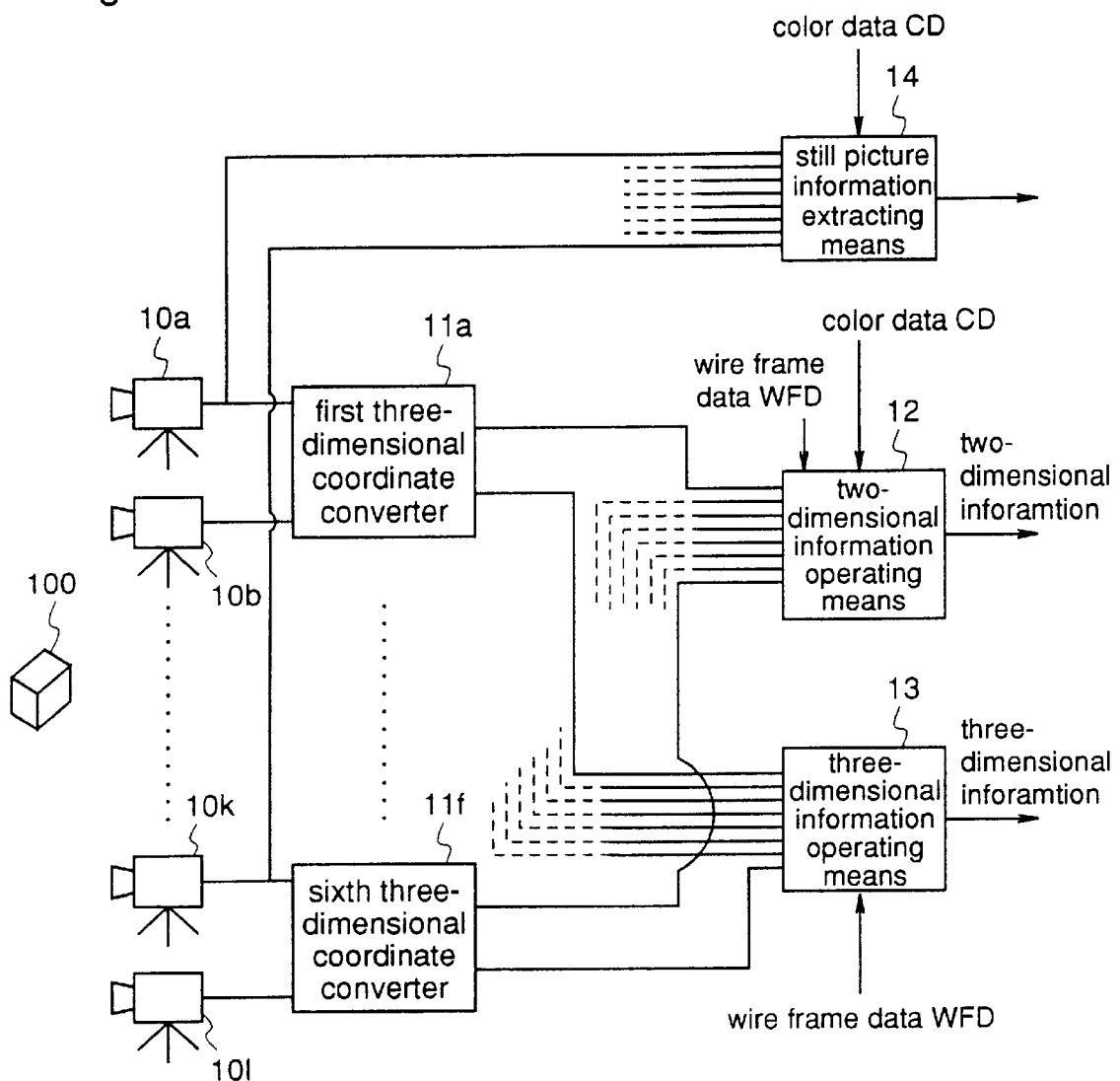
FIG. 5 illustrates a detailed construction of the video signal producing means in the apparatus for transmitting/receiving TV signals according to an embodiment 2 of the present invention.

As illustrated in FIG. 5, Wire Frame Data (WFD) of the stereoscopic object produced by CAD or the like and Color Data (CD) are input to a two-dimensional information operating means 12. Wire Frame Data (WFD) of the stereoscopic object produced by the CAD or the like is input to a three-dimensional information operating means 13. Color Data (CD) of the stereoscopic object produced by the CAD or the like is input to a still picture information extracting means 14. By the two-dimensional information operating means 12, the three-dimensional information operating means 13 and the still picture information extract means 14, inputting of the video output from the video cameras described in the embodiment 1 and inputting of the above-described data to the means 12, 13, 14 are switched to output desired data. As a result, data in a desired format produced by the CAD or the like can be employed as input video information, and a video image viewed from an arbitrary view according to the present invention can be displayed together with the data in a desired format.

With the construction, completed prediction image data of a building is transmitted from the transmitter's side, and the completed prediction image of the building from the arbitrary angle which the viewer demands is displayed at the receiver's side.

In the embodiments, the video images of the stereoscopic object 100 to be represented as TV video images are taken from six directions, so that viewing from all directions is possible. Alternatively, the present invention is applicable to a program, for example, an "igo" program or a sport program, in which the stereoscopic object is to be viewed only from 2 to 4 directions, where only required number of pairs of video cameras are provided.

What is claimed is:

1. A method of transmitting TV signals comprising:

transmitting three-dimensional information representing a three-dimensional configuration of a stereoscopic object to be transmitted, image information of the stereoscopic object obtained when the stereoscopic object to be transmitted is viewed from a plurality of directions and two-dimensional information indicating a correspondence between points in a surface of the stereoscopic object represented by the three-dimensional information and the image information of the stereoscopic object, as the TV signals;

wherein said three-dimensional information, said two-dimensional information and luminance information comprising a distance between a light source and a point on said stereoscopic object and an angle of a light source with respect to a point on said stereoscopic object are transmitted using vacant scanning lines within a vertical blanking interval.

2. An apparatus for transmitting TV signals comprising:

a three-dimensional information extracting means for extracting three-dimensional configuration information representing a three-dimensional configuration of a stereoscopic object from stereoscopic information of the stereoscopic object viewed from a respective direction among a plurality of directions;

an image information extracting means for extracting image information of the stereoscopic object viewed from respective directions among the plurality of the directions; and a two-dimensional information extracting means for extracting two-dimensional information indicating a correspondence between points in a surface of the stereoscopic object represented by the three-dimensional information and the image information of the stereoscopic object;

wherein said three-dimensional information, said two-dimensional information and luminance information comprising a distance between a light source and a point on said stereoscopic object and an angle of a light source with respect to a point on said stereoscopic object are transmitted using vacant scanning lines within a vertical blanking interval.

3. The apparatus for transmitting TV signals of claim 2 wherein data of the stereoscopic object is produced by a computer, and the three-dimensional information extracting means, the image information extracting means and the two-dimensional information extracting means produce three-dimensional information, image information and two-dimensional information of the stereoscopic object from the data produced by the computer.

4. A method of receiving TV signals comprising:

storing data comprising three-dimensional information representing a three-dimensional configuration of a stereoscopic object, image information of the stereoscopic object obtained when the stereoscopic object to be transmitted is viewed from a plurality of information and two-dimensional information indicating a correspondence between points in a surface of the stereoscopic object represented by the three-dimensional information and the image information of the stereoscopic object, transmitted as TV signals, wherein an extracting means extracts information according to user selectable parameters prior to transmission; and selecting required data among the stored data upon receipt of an external instruction signal, followed by operation and display, to display video image of the stereoscopic object on a channel, viewed from an angle determined by the instruction signal;

wherein said three-dimensional information and said two-dimensional information are transmitted using vacant scanning lines within a vertical blanking interval.

5. An apparatus for receiving TV signals comprising:

a data storage means for storing three-dimensional information representing a three-dimensional configuration of a stereoscopic object, image information of the stereoscopic object obtained when the stereoscopic object to be transmitted is viewed from a plurality of directions and two-dimensional information indicating a correspondence between points in a surface of the stereoscopic object represented by the three-dimensional information and the image information of the stereoscopic object, transmitted as TV signals;

a data operation and display means for selecting required data among data stored in the data storage means, followed by operation and display, upon receipt of an external instruction signal, to display a video image of the stereoscopic object on a channel viewed from an angle determined by the instruction signal;

wherein said three-dimensional information, said two-dimensional information and luminance information comprising a distance between a light source and a point on said stereoscopic object and an angle of a light source with respect to a point on said stereoscopic object are transmitted using vacant scanning lines within a vertical blanking interval.

6. A method of transmitting/receiving TV signals comprising:

transmitting data comprising three-dimensional information representing a three-dimensional configuration of a stereoscopic object to be transmitted, image information obtained when the stereoscopic object to be transmitted is viewed from a plurality of directions and two-dimensional information indicating a correspondence between points in a surface of the stereoscopic object represented by the three-dimensional information and the image information of the stereoscopic object, as the TV signals;

storing the three-dimensional information, the image information and the two-dimensional information of the stereoscopic object upon receipt of the transmitted TV signals; and selecting required data among the stored data upon receipt of an external instruction signal, followed by operation and display, to display a video image of the stereoscopic object on a channel, viewed from an angle determined by the instruction signal;

wherein said three-dimensional information, said two-dimensional information and luminance information comprising a distance between a light source and a point on said stereoscopic object and an angle of a light source with respect to a point on said stereoscopic object are transmitted using vacant scanning lines within a vertical blanking interval.

7. An apparatus for transmitting/receiving TV signals comprising:

in a transmission section, a three-dimensional information extracting means for extracting a three-dimensional configuration representing a three-dimensional configuration of a stereoscopic object from stereoscopic information of the stereoscopic object viewed from respective direction among the plurality of directions;

an image information extracting means for extracting image information of the stereoscopic object viewed from respective direction among the plurality of the directions; and a two-dimensional information extracting means for extracting two-dimensional information indicating a correspondence between points in a surface of the stereoscopic object represented by the three-dimensional information and the image information of the stereoscopic object;

wherein said three-dimensional information, said two-dimensional information and luminance information comprising a distance between a light source and a point on said stereoscopic object and an angle of a light source with respect to a point on said stereoscopic object are transmitted using vacant scanning lines within a vertical blanking interval;

the apparatus further comprising:

in a receiving section, a data storage means for storing the three-dimensional information, the image information and the two-dimensional information; and a data operation and display means for selecting required data among the stored data in the storage means, followed by operation and display, upon receipt of an external instruction signal, to display a video image of the stereoscopic object on a channel, viewed from an angle determined by the instruction signal.

* * * * *